United States Patent [19]
Mor

[11] Patent Number: 5,863,466
[45] Date of Patent: Jan. 26, 1999

[54] ELECTROSTATIC DISSIPATIVE COMPOSITION

[76] Inventor: Ebrahim Mor, 4 Larkfield La., Laguna Niguel, Calif. 92677

[21] Appl. No.: 795,873

[22] Filed: Feb. 6, 1997

[51] Int. Cl.$^6$ ............... H01B 1/20; C08K 5/41
[52] U.S. Cl. ............ 252/500; 524/156; 524/157; 524/236
[58] Field of Search .............. 252/500, 519.21, 252/521.6; 524/156, 157, 236; 428/922

[56] References Cited

U.S. PATENT DOCUMENTS

| | | | |
|---|---|---|---|
| 2,129,264 | 9/1938 | Downing | 260/501 |
| 2,697,116 | 12/1954 | Stayner | 260/501 |
| 2,871,218 | 1/1959 | Schollenberger | 260/45.4 |
| 3,012,992 | 12/1961 | Pigott et al. | 260/75 |
| 3,214,411 | 10/1965 | Saunders et al. | 260/75 |
| 3,225,073 | 12/1965 | Glabisch et al. | 260/401 |
| 3,259,607 | 7/1966 | Cherdron et al. | 260/78.3 |
| 3,280,179 | 10/1966 | Ernst | 260/501 |
| 3,285,855 | 11/1966 | Dexter et al. | 252/57 |
| 3,299,171 | 1/1967 | Knobloch et al. | 260/857 |
| 3,351,557 | 11/1967 | Almstead et al. | 252/106 |
| 3,539,521 | 11/1970 | Snoddy et al. | 252/137 |
| 3,579,489 | 5/1971 | Wagner . | |
| 3,619,115 | 11/1971 | Diehl et al. . | |
| 3,644,482 | 2/1972 | Dexter et al. . | |
| 3,867,324 | 2/1975 | Clendinning et al. . | |
| 4,005,029 | 1/1977 | Jones . | |
| 4,088,612 | 5/1978 | Carter et al. . | |
| 4,191,818 | 3/1980 | Illers et al. . | |
| 4,400,498 | 8/1983 | Konishi et al. . | |
| 4,439,552 | 3/1984 | Dedolph . | |
| 4,762,884 | 8/1988 | Goyert et al. . | |
| 4,797,447 | 1/1989 | Gergen et al. . | |
| 4,900,776 | 2/1990 | Bock et al. . | |
| 4,906,687 | 3/1990 | Modic . | |
| 5,015,412 | 5/1991 | Zeman . | |
| 5,096,939 | 3/1992 | Mor . | |
| 5,159,053 | 10/1992 | Kolycheck et al. . | |
| 5,187,214 | 2/1993 | Govindan | 524/157 |
| 5,342,889 | 8/1994 | Sullivan et al. . | |
| 5,508,099 | 4/1996 | Incorvia | 428/265 |

FOREIGN PATENT DOCUMENTS 2331057  1/1974  Germany ............ C07C 143/14

OTHER PUBLICATIONS

"Surface Active Sulfobetaines,",Parris et al., J. American Oil Chemists' Society, Feb. 1976, pp. 60–63.
"Barrier Materials, Flexible, Electrostatic Protective, Heat Sealable" Military Specification MIL–B–81705C, Jan. 1989, w a Static Decay Meter Model 406C from Electro–Tech Systems, Inc.
Stat–Rite®, B. F. Goodrich—Product Brochure, Ca. Jun. 17, 1992.
LDPE, Rexene—Product Brochure, Jan. 1990.
Tone® Polymer P767E, Union Carbide Chemicals and Plastic Company—Product Brochure, 1990.
Larostat® HTS 905, PPG Industries—Technical Bulletin, Sep. 26, 1995.

*Primary Examiner*—Mark Kopec
*Attorney, Agent, or Firm*—Jenkens & Gilchrist; A. M. Arismendi, Jr.

[57] ABSTRACT

Thermoplastic compositions are provided which have electrostatic dissipative properties. The thermoplastic composition is prepared by combining at least the following initial ingredients: (i) a thermoplastic polyurethane, which is prepared by reacting a polyalkylene glycol, a diisocyanate and a chain extender having at least two hydroxyl groups, (ii) a thermoplastic polyester, wherein the polyester is a polylactone, and (iii) a quaternary ammonium compound. The composition may additionally include an organic polymer to which is imbued electrostatic dissipative properties as a result of incorporating the three initial ingredients.

19 Claims, 6 Drawing Sheets

ELECTROSTATIC DISSIPATIVE COMPOSITION

FIELD OF THE INVENTION

The present invention pertains to thermoplastic compositions useful as electrostatic dissipating agents or compositions.

BACKGROUND

The electronic structure of a polymer is the main, but not only, reason for its inherent electrical charge. The formation and retention of charges of static electricity on the surface of most plastics is well known. Localized free electrons on the surface of polymers, which are a result of unsatisfied valent bonds responsible for chemical linkages, produce the inherent electrical charge of the polymer. Plastic materials have a significant tendency to accumulate static electrical charges due to low electrical conductivity. Friction between dissimilar electrical insulators can produce significant static charge in a short time. Friction force generated by mechanical motions during processing of polymers (e.g., mixing, extrusion, milling, etc.) not only converts mechanical energy to heat, but is also responsible for the separation of electrons from the surface, which results in static charge.

This static charge is undesirable for a variety of reasons: dust attraction, interference with processing during compounding or fabrication of the final product, and spark generation from static buildup, which can produce serious accidents such as fire or explosion. The presence of static electrical charges on sheets of thermoplastic film, for example, can cause the sheets to adhere to one another thus making their separation for further processing more difficult. Moreover, the presence of static electrical charges causes dust to adhere to items packaged in a plastic bag, for example, which may negate any sales appeal.

The increasing complexity and sensitivity of microelectronic devices makes the control of static discharge of particular concern to the electronic industry. Even a low voltage discharge can cause severe damage to sensitive devices. The need to control static charge buildup and dissipation often requires the total assembly environment to be constructed of partially conductive materials. It also may require electrostatic protective package, tote boxes, holders, housings, casings, and covers be made from conductive polymeric materials to store, ship, protect, or support electrical devices and equipment.

Dissipation of electric charge from polymer surfaces has been accomplished up until now by the addition of various electrostatic dissipative (ESD) materials, e.g., surfactant chemicals, or conductive fillers to the polymer. The ESD materials or conductive fillers may be compounded with and incorporated into the host polymer during processing as an internal antistat. Alternatively, the ESD materials may be topically applied, e.g., by spraying or dip coating, to the polymer-containing article after manufacture although this method usually results in a temporary solution.

These technologies have several manufacturing and performance limitations. For example, the levels of additive and filler that are required to provide sufficient conductivity for dissipating the electrical charge are very high. Though the use of conductive fillers (graphite, metals, organic semiconductors) to increase conductivity of polymers produces a highly-dissipative solution, the finished parts lack colorability and suffer from a reduction in physical strength and inconsistent performance. Migration of the chemicals to the polymer surface could interfere with the printing and sealing process. Limitations in storage and shelf life, corrosivity of the chemicals, and last but not least, the dependencies on environmental humidity for satisfactory performance are additional examples of the technologies' limitations.

There are five different groups of chemicals used as topical or internal antistats. These chemicals belong to the surfactant chemical family group and perform their ESD function by altering the surface energy of the plastic part. These chemicals with their respective chemical structures are illustrated below:

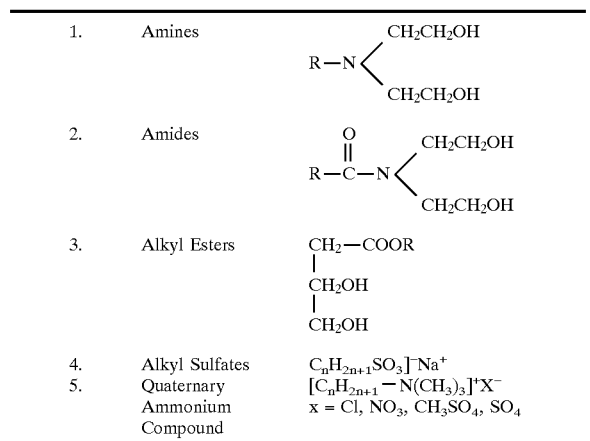

All of these chemicals follow the same mechanism in dissipating the static charge: by forming a hydrogen bond with atmospheric moisture. This bond is extremely weak and is not a chemical bond. This bond is only strong enough to form a microscopic layer of water on the surface of the polymer to dissipate the electrical charge following ionic conductivity principles.

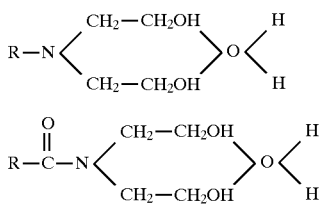

R= Alkyl Chain

As previously mentioned, in order for these chemicals to perform as an antistat, they must first migrate to the surface in sufficient quantity and rate (which depends on the compatibility of these chemicals with host polymers as well as the temperature of the environment). Secondly, there must be enough moisture present in the environment to form the hydrogen bond and water layer on the surface.

However, the incorporation of these lower molecular weight ESD materials (antistatic agents) into the various polymers has its own limitations. For example, during the hot temperatures required during conventional processing, many of such antistatic agents cannot withstand high temperatures and are damaged or destroyed, thereby being rendered useless with respect to their ESD properties. Also, many of the higher molecular weight ESD agents are not compatible with the base polymers employed, and if the refractive indices differ by more than about 0.02, there can be a substantial reduction in the transparency of the composition. These compositions may be unacceptable for transparent applications. For example, in a polymer blend where the dispersed phase particle size is greater than 0.1 micron, the smaller the difference in the refractive indices between the additives and the base polymer the greater the clarity of the article made from the mixture.

A large number of antistatic agents are also either cationic or anionic. These tend to cause the degradation of plastics, particularly PVC, and result in discoloration or loss of physical properties. Other antistatic agents have significantly lower molecular weights than the base polymers themselves. Often these lower molecular weight antistatic agents possess undesirable lubricating properties and are difficult to incorporate into the polymer. Incorporation of the lower molecular weight antistatic agents into the polymers often will reduce the moldability of the base plastic because the antistatic agents can move to the surface of the plastic during processing and frequently deposit a coating on the surface of the molds, possibly destroying the surface finish on the articles of manufacture. In severe cases, the surface of the article of manufacture becomes quite oily and marble-ized. Additionally, the lower molecular weight ESD agents often tend to lose their ESD capability due to evaporation, develop undesirable odors, and can promote stress cracking or crazing on the surface of an article in contact with the article of manufacture.

One of the known lower molecular weight antistatic agents is a homopolymer or copolymer oligomer of ethylene oxide. Generally, use of the lower molecular weight polymers of ethylene oxide or polyethers as antistatic agents are limited by the above-mentioned problems relative to lubricity, surface problems, or less effective ESD properties. Further, these low molecular weight polymers can be easily extracted or abraded from the base polymer thereby relinquishing any electrostatic dissipative properties.

There are several examples of high molecular weight electrostatic dissipative agents in the prior art. In general, these additives have been high molecular weight polymers of ethylene oxide or a derivative thereof like propylene oxide, epichlorohydrin, glycidyl ethers and the like. It has been a requirement that these additives be high molecular weight materials to overcome the problems mentioned above. However, these prior art ESD additives result in articles having high haze values and thus are not transparent enough for some end uses.

Prior to the present invention, the utilization of low molecular weight polyether oligomers as antistatic agents was impractical as these low molecular weight oligomers suffer from problems such as blooming.

Other polyurethane polymers including polyester-based polyurethanes are disclosed in the following patents: U.S. Pat. No. 2,871,218 disclosing extruded plastic sheets resistant to hydrocarbon solvents but soluble in polar solvents; U.S. Pat. No. 4,400,498 pertaining to heat and solvent resistant crosslinked polyurethanes particularly adapted to disperse fillers and pigments and useful for adhesives; U.S. Pat. No. 4,191,818 directed to heat resistant, crosslinked crystalline polyurethanes used in elastomeric cast moldings; U.S. Pat. No. 3,214,411 suggesting polyester polyurethane polymers adapted to be heat crosslinked in high heat injection molding processes; and U.S. Pat. No. 3,012,992 disclosing load bearing, crosslinked polyurethane castings and plastics. U.S. Pat. No. 4,439,552 discloses cellular polyurethane foams, whereas U.S. Pat. No. 4,762,884 discloses radiation activated crosslinked polyurethanes.

Recently, polymer industries have been researching ways to develop an Inherently Dissipative Polymer (IDP) to reduce or eliminate the problems associated with the addition of chemicals to polymers for use as ESD materials, i.e., antistats. In some areas, the industry has been successful in developing an IDP for specific polymers or specific applications; examples of such products include B. F. Goodrich's STAT-RITE, and Allied Signal's VERSICON. Both products have limited to no success when used in non-polar polymers, e.g., polyolefins.

SUMMARY OF THE INVENTION

This new technology is based on developing hydrogen-bonded material, to be present on the surface and within the polymer matrix, to permit electronic charge transfer without migration of ions to dissipate the charge.

The hydrogen-bonded material will eliminate moisture dependency and the heat stability problems associated with prior art technology. Since there is no chemical to migrate to the surface, printing, sealing and shelf life problems are also reduced or eliminated. Further, blooming is eliminated.

Accordingly, there is provided a composition, wherein the composition is prepared by combining at least the following initial ingredients:

a thermoplastic polyurethane, which is prepared by reacting a polyalkylene glycol, a diisocyanate and a chain extender having at least two hydroxyl groups;

a thermoplastic polyester, wherein the polyester is a polylactone; and a quaternary ammonium compound having the formula

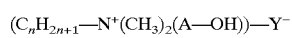

wherein n is an integer ranging from 6 to 22,

A is the hydrocarbon residue of an alkylene oxide having from 2 to about 5 carbon atoms, and Y is $CH_3SO_3$, $CH_3SO_4$, $SO_4$. A particularly preferred quaternary ammonium compound having the foregoing structure is one in which n=8, A=$CH_2CH_2$, and Y=$CH_3SO_3$.

The thermoplastic polyurethane and thermoplastic polyester preferably have compatible melting temperatures, preferably within 100° C. of each other.

The composition of the present invention may be modified by varying the initial ingredients to make it compatible with a wide range of polymers, surprisingly including non-polar polymers such as polyolefins. With this composition, problems associated with compatibility of IDP, or humidity dependency and migration problems, have been resolved. This composition exhibits good electrostatic dissipative properties for use as an ESD agent in blends with other polymers or by itself. In particular, when used alone, it may also exhibit excellent transparency.

The polyurethane polymer has an average molecular weight from about 60,000 to about 500,000 and comprises a hydroxyl terminated ethylene ether oligomer glycol intermediate having an average molecular weight from about 500 to 5,000 reacted with a non-hindered molecular weight thermoplastic polyurethane. The ethylene ether oligomer glycol intermediate is a polyethylene glycol.

The polyester polymer has an average molecular weight from about 5,000 to about 100,000, preferably from about 14,000 to about 50,000. A particularly preferred polyester is poly(ε-caprolactone).

These and other advantages of the present invention will become more apparent by referring to the detailed description of the invention and the illustrative examples.

THE DESCRIPTION OF THE DRAWINGS

The novel features of the invention are set out with particularity in the appended claims, but the invention will be understood more fully and clearly from the following detailed description of invention and the accompanying drawings, in which:

DETAILED DESCRIPTION OF THE INVENTION

Figure 1:
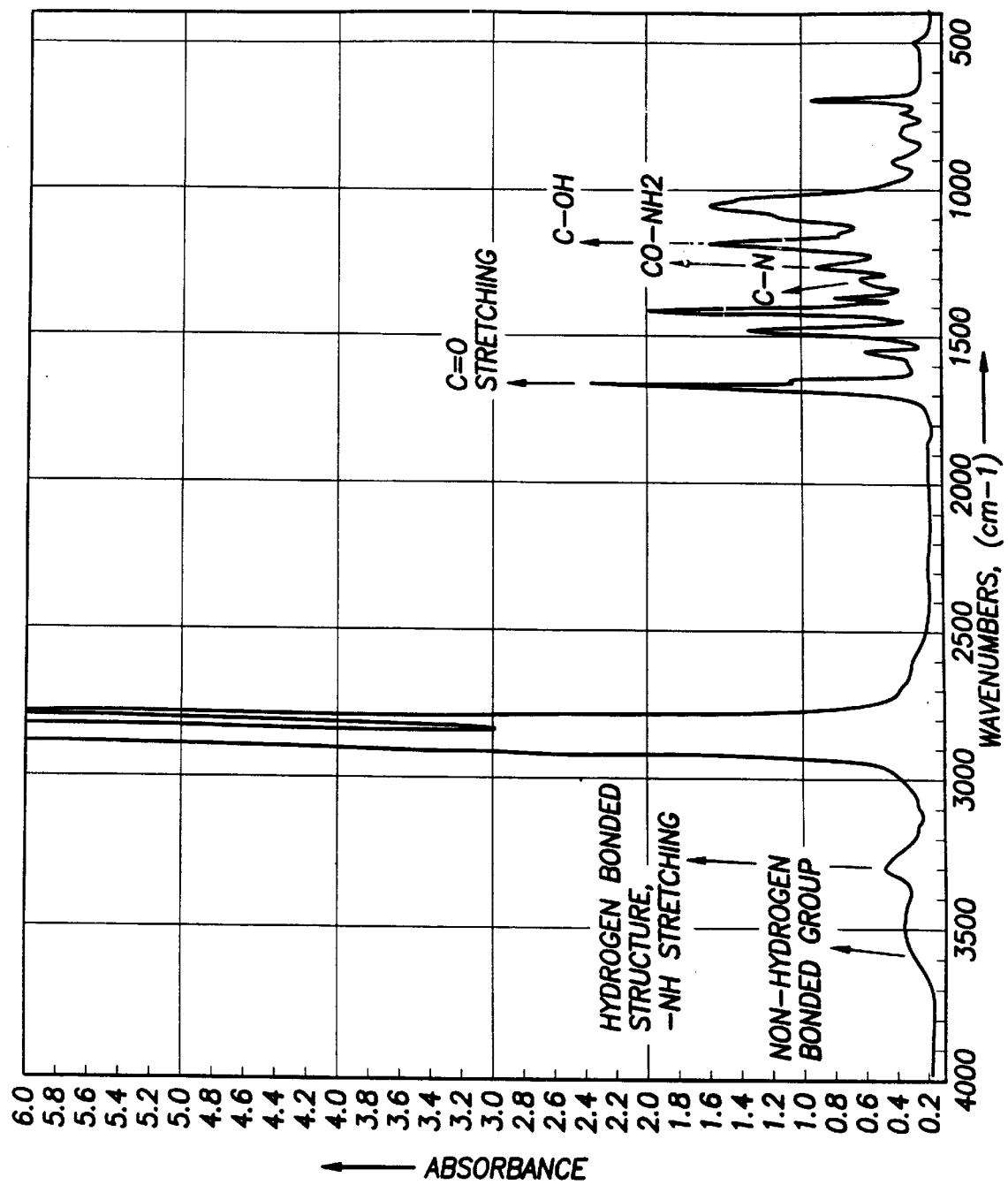
FIG. 1 is the Macro-FTIR absorbance curve of Concentrate A.

Accordingly, there is provided a composition, wherein the composition is prepared by combining at least the following initial ingredients:

a thermoplastic polyurethane, which is prepared by reacting a polyalkylene glycol, a diisocyanate and a chain extender having at least two hydroxyl groups;

a thermoplastic polyester, wherein the polyester is a polylactone; and a quaternary ammonium compound having the formula

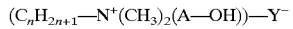

$$(C_nH_{2n+1}\text{—}N^+(CH_3)_2(A\text{—}OH))\text{—}Y^-$$

wherein n is an integer ranging from 6 to 22, preferably 7 to 16,

A is the hydrocarbon residue of an alkylene oxide having from 2 to about 5 carbon atoms, and Y is $CH_3SO_3$, $CH_3SO_4$, $SO_4$.

The thermoplastic polyurethane and polyester have compatible melting temperatures, that is, their melting temperatures are within 100° C. of each other.

In accordance with this invention, an electrostatic dissipative plastic composition is prepared by the admixture of an organic polymeric material and an inherently dissipative composition. Alternatively, the organic polymeric material may be omitted and the inherently dissipative composition used alone as the plastic composition.

Organic Polymeric Materials

Typical organic polymeric materials contemplated include synthetic organic polymers and copolymers, especially (i) non-polar polymers including polyethylene, polypropylene, poly(1-butene), poly(4-methyl-1-pentene), ethylene-propylene copolymers, ethylene-1-butene copolymers, and ethylene-1-hexene copolymers, and homopolymers and copolymers of conjugated dienes monomers, copolymers of two or more conjugated dienes, and copolymers of a conjugated diene and another vinyl monomer, wherein the conjugated dienes are preferably ones containing from 4 to 8 carbon atoms, e.g., butadiene, isoprene and the like, and (ii) polymers containing polar groups including ethylene-vinyl acetate copolymers, ethylene-ethyl acrylate copolymers, ethylene-acrylic acid copolymers and their salts, polystyrene, rubber-modified polystyrene, styrene-butadiene copolymers, styrene-isoprene copolymers, polyvinyl chloride, poly(vinylidene chloride), polyvinyl flouride, poly(vinylidene flouride), polyoxymethylene, poly(ethylene oxide), poly(propylene oxide), polyvinyl alcohol, polyvinyl acetate, polyvinyl formal, polyvinyl butyral, poly(methyl acrylate), poly(ethyl acrylate), poly(ethylene terephthalate), vinyl chloride-vinyl acetate copolymers, cellulose acetate, cellulose propionate, cellulose acetate butyrate, ethyl cellulose, methyl cellulose, hydroxyethyl cellulose, hydroxypropyl cellulose, acylonitrile polymers and copolymers, and methacrylonitrile polymers and copolymers. Polyamides may also be used. The polyamides may be α-polyamides, α,ω-polyamides, and mixtures and/or copolymers of these. An example of an α-polyamide is polycaprolactam(nylon 6), and an example of an α,ω-polyamide is polyhexamethylene adipamide (nylon 6:6). See U.S. Pat. No. 4,906,687, issued to Modic, which is hereby incorporated by reference. Preferred polymers include organic hydrocarbon polymers such a polyethylene, polypropylene, poly(4-methyl-1-pentene), and polystyrene.

Polyurethane

The thermoplastic polyurethane useful in the present invention is prepared by reacting a polyalkylene glycol, a diisocyanate and a chain extender having at least two hydroxyl groups. Such polyurethanes are disclosed in U.S. Pat. No. 5,159,053, which is hereby incorporated by reference.

In the first embodiment of the invention, the thermoplastic polyurethane polymer of the present invention, useful as an elastomeric melt or binder in a fabric reinforced flexible fuel tank, comprises the reaction of a hydroxyl terminated ethylene ether oligomer intermediate with a non-hindered diisocyanate and a chain extender glycol, where the oligomer can be a diethylene glycolaliphatic polyester, or a polyethylene glycol. For the second embodiment, the oligomer is strictly a polyethylene glycol.

Referring first to the polyester intermediate, a hydroxyl terminated, saturated polyester polymer is synthesized by reacting excess equivalents of diethylene glycol with considerably lesser equivalents of an aliphatic, preferably an alkyl, dicarboxylic acid having four to ten carbon atoms where the most preferred is adipic acid. Other useful dicarboxylic acids include succinic, glutaric, pimelic, suberic, azelaic and sebacic acids. The most preferred polyester intermediate is polydiethylene glycol adipate. In accordance with this aspect of the present invention, excess moles of diethylene glycol are reacted with lesser moles of dicarboxylic acid at levels from about 5 mole percent to about 50 mole percent excess of glycol to provide a hydroxyl terminated polyester oligomer chain having an average molecular weight between about 500 to 5,000 and preferably between about 700 and 2,500. The short chain polyester oligomer contains repeating diethylene ether structures and comprises on an equivalent basis from about 1.05 to 1.5 equivalents of diethylene glycol co-reacted with one equivalent of dicarboxylic acid to produce the low molecular weight polyester oligomer intermediate. The high excess equivalents of diethylene glycol controls the molecular weight of the polyester oligomer preferably below 2,500 and further assures a hydroxyl terminated linear polyester oligomer. The polyester oligomers synthesized by reacting the diethylene glycol with lesser equivalents of dicarboxylic acid at temperatures of from about 300° F. to 450° F. in the absence or in the presence of an esterification catalyst such as stannous chloride for time sufficient to reduce the Acid No. to about zero.

The hydroxyl terminated polyester oligomer intermediate is further reacted with considerably excess equivalents of non-hindered diisocyanate along with chain extender glycol in a so-called one-shot or simultaneous co-reaction of oligomer, diisocyanate, and chain extender glycol to produce the very high molecular weight linear polyurethane having an average molecular weight broadly from about 60,000 to about 500,000, preferably from about 80,000 to about 180,000, and most preferably from about 100,000 to about 180,000. The very high molecular weight linear polyurethane based on the polyester oligomer in accordance with this aspect of the invention is unique in that an extraordinary high molecular weight polyurethane polymer is produced from a low molecular weight polyester oligomer prepolymer.

In accordance with a preferred aspect of this invention, an ethylene ether oligomer glycol intermediate comprising a polyethylene glycol can be co-reacted with non-hindered diisocyanate and extender glycol to produce the high molecular weight polyurethane polymer. Useful polyethylene glycols are linear polymers of the general formula H—(OCH$_2$CH$_2$)$_n$—OH where n is the number of repeating ethylene ether units and n is at least 11, preferably from 11 to about 115. On a molecular weight basis, the polyethylene glycols have an average molecular weight of at least about 500, preferably from about 500 to about 5,000, and more preferably from about 700 to about 2,500. Commercially available polyethylene glycols useful in this invention are typically designated as polyethylene glycol 600, polyethylene glycol 1500, and polyethylene glycol 4000 with the number representing the average molecular weight thereof.

These high molecular weight thermoplastic polyurethanes are produced by reacting together preferably in a one-shot process the ethylene ether oligomer glycol intermediate, an aromatic or aliphatic non-hindered diisocyanate, and an extender glycol. On a mole basis, the amount of chain extender glycol for each mole of oligomer glycol intermediate is from about 0.1 to about 3.0 moles, preferably from about 0.2 to about 2.1 moles, and more preferably from about 0.5 to about 1.5 moles. On a mole basis, the high molecular weight polyurethane polymer comprises from about 0.97 to about 1.02 moles, and preferably about 1.0 moles of diisocyanate, preferably non-hindered diisocyanate, for every 1.0 total moles of both the extender glycol and the oligomer glycol (i.e. moles of chain extender glycol+oligomer glycol=1.0).

Useful non-hindered diisocyanates comprise aromatic non-hindered diisocyanates and include, for example, 1,4-diisocyanatobenzene (PPDI), 4,4'-methylene-bis (phenyl isocyanate) MDI), 1,5-naphthalene diisocyanate (NDI), toluene diisocyanate (TDI), m-xylene diisocyanate (XDI), as well as non-hindered, cyclic aliphatic diisocyanates such as 1,4-cyclohexyl diisocyanate (CHDI) and 4,4'-methylene bis (cyclohexyl isocyanate) (H$_{12}$ MDI). The most preferred diisocyanate is MDI.

Suitable chain extender glycols are aliphatic short chain glycols having two to about six carbon atoms and containing at least two primary alcohol groups. Preferred glycols include diethylene glycol, 1,3-propane diol, 1,4-butane diol, 1,5-pentane diol, and 1,6-hexane diol with the most preferred glycol being 1,4-butane diol.

In accordance with the present invention, the hydroxyl-terminated ethylene ether oligomer intermediate, the non-hindered diisocyanate, and the chain extender glycol are co-reacted simultaneously in a one-shot polymerization process at a temperature above about 100° C. and usually about 120° C., whereupon the reaction is exothermic and the reaction temperature is increased to about 200° C. to about 250° C.

Polyester

The thermoplastic polyesters employed in the present invention are polyesters having a recurring ester linkage in the molecule, for example, polylactones. The polyesters have a generally crystalline structure with a melting point over 120° C. or are generally amorphous with a glass transition temperature above 25° C., and are thermoplastic as opposed to thermosetting. The number average molecular weight of the polyesters is generally from about 5,000 to about 100,000 and preferably from about 10,000 to about 50,000.

Polylactones have recurring ester structural units such as those obtained by ring opening polymerization of a cyclic lactone such as pivalolactone, β-propiolactone and ε-caprolactone, or combinations of cyclic lactones. Accordingly, examples of suitable polylactones are poly (pivalolactone), poly(β-propiolactone) and poly(ε-caprolactone).

Polypivalolactone is a linear polymer having recurring ester structural units mainly of the formula:

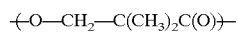

i.e., units derived from pivalolactone. Preferably, the polyester is a pivalolactone homopolymer. Also included, however, are the copolymers of pivalolactone with not more than 50 mole percent, preferably not more than 10 mole percent of other β-propiolactones, such as β-propiolactone; α, α-diethyl-β-propiolactones; and α-methyl-α-ethyl-β-propiolactone. The term "β-propiolactones" refers to β-propiolactone (2-oxetanone) and to derivatives thereof which carry no substituents at the β-carbon atom of the lactone ring. Preferred β-propiolactones are those containing a tertiary or quaternary carbon atom in the α position relative to the carbonyl group. Especially preferred are the α, α-dialkyl-β-propiolactones wherein each of the alkyl groups independently has from one to four carbon atoms. Examples of useful monomers are:

α-ethyl-α-methyl-β-propiolactone,
α-methyl-α-isopropyl-β-propiolactone,
α-ethyl-α-n-butyl-β-propiolactone,
α-chloromethyl-α-methyl-β-propiolactone,
α, α-bis(chloromethyl)-β-propiolactone, and
α, α-dimethyl-β-propiolactone, (pivalolactone).

See generally U.S. Pat. Nos. 3,259,607; 3,299,171; and 3,579,489 which are incorporated herein by reference. These polypivalolactones have a molecular weight in excess of 20,000 and a melting point in excess of 120° C.

Another useful polyester which may be obtained from a cyclic lactone is polycaprolactone. Typical poly(ε-caprolactones) are substantially linear polymers in which the repeating unit is

These polymers have similar properties to the polypivalolactones and may be prepared by a similar polymerization mechanism. See generally U.S. Pat. No. 3,259,607.

Quaternary Ammonium Compound

The quaternary ammonium compounds useful in the present invention have the formula

wherein n is an integer ranging from 6 to 22, preferably 7 to 16,

A is the hydrocarbon residue of an alkylene oxide having from 2 to about 5 carbon atoms, preferably 2 to 3 carbon atoms, X is hydrogen (H—) or hydroxyl (—OH) groups, and Y is $CH_3SO_3$, $CH_3SO_4$, $SO_4$, preferably $CH_3SO_3$.

Such compounds are commercially available, for example, LAROSTAT® HTS905 available from PPG Industries and having the chemical structure $C_8H_{17}$—$N^+(CH_3)_2$($CH_2CH_2$—OH))—$CH_3SO_3^-$. One name for LAROSTAT® HTS905 is 3-(N,N-dimethyl-N-octyl-ammonio)-2-hydroxy propane-1-sulfonate. Another commercially available compound is Monaquat P-TC available from Mona Industries, Inc., St. Paterson, N.J.

The quaternary ammonium compound useful in the present invention preferably has the general formula

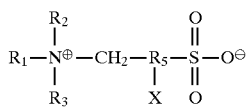

wherein $R_1$ represents an alkyl group having from about 6 to about 22 carbon atoms, $R_2$ and $R_3$ are each selected from the group consisting of methyl, ethyl, propyl, butyl, and hydroxyethyl groups, $R_5$ is an alkylene group having from 1 to about 3 carbon atoms, and X is selected from the group consisting of hydrogen (H—) and hydroxyl groups. Branched chain alkylene groups, e.g.,

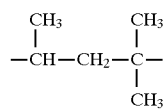

can be substituted for the

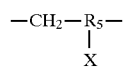

group in the above formula.

Compounds which conform to the above general formula are characterized by the presence of both positive and negative charges which are internally neutralized (i.e., zwitterionic). Where $R_1$ is 16 carbon atoms, $R_2$ and $R_3$ are methyl groups, and $R_5$ is an ethylene group, the chemical name is 3-(N,N-dimethyl-N-hexadecylammonio) propane-1-sulfonate. Where $R_1$ is 16 carbon atoms, $R_2$ and $R_3$ are methyl groups and $R_5$ is an ethylene group with a hydroxy group attached to the second carbon atom, the compound can be described as 3-(N,N-dimethyl-N-hexadecylammonio)-2-hydroxypropane-1-sulfonate. These compounds can be prepared in the manner disclosed in U.S. Pat. No. 2,129,264 and German Pat. No. 1,018,421, which are hereby incorporated by reference. See also, Parris et al; "Surface Active Sulfobetaines," J. of the American Oil Chemists' Society, pp. 60–63, February 1976, which is hereby incorporated by reference.

More preferably, the quaternary ammonium compounds useful in the present invention can be represented conventionally by the following general structure:

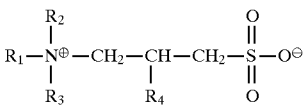

where $R_1$ is a C6–C22 alkyl group;

$R_2$ and $R_3$ are a methyl group, a 2-hydroxy ethyl group, or a 2-hydroxy propyl group; and $R_4$ is H or OH.

Within the alkyl group range of about C6–C12, i.e., having 6 to 12 carbon atoms, these compounds possess water solubility. At chain lengths above C12, water solubility of these compounds at high pHs (pH levels above 13) typically is lost (i.e. the compound becomes insoluble in highly alkaline water). While various reaction schemes may be envisioned for synthesis of such alkyl-containing compounds useful in the present invention, the following two-step reaction scheme disclosed in U.S. Pat. No. 5,015,412, which is hereby incorporated by reference, may be used when $R_4$ is OH. The initial step involves the formation of an epichlorhydrin/bisulfite intermediate. This reaction conveniently is conducted in water in the presence of a base (for example, sodium hydroxide) at relatively moderate reaction temperatures (e.g. 120°–200° F.) and preferably under inert atmosphere. Following the formation of the epichlorhydrin/bisulfite intermediate, such intermediate is reacted with the appropriate amine for forming the desired product. This second reaction step is conducted at reaction temperatures ranging from about 100° to 200° F. Unreacted material then can be neutralized and/or removed and the pH and percent non-volatile solids of the reaction product adjusted as is necessary, desirable, or convenient in conventional fashion.

For a quaternary ammonium compound where $R_4$ is H, a propyl sultone,

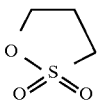

can be reacted with the appropriate amine.

It is surprising that these compounds find utility in the present invention. In the past, such compounds have been used in a variety of nonanalogous applications. Such applications include for example, bottle washing compounds, hot vat cleaning compounds, paper pulping, paint strippers, railroad and aircraft cleaners, dairy and food plant cleaners, detergent sanitizers, polymer-based wax strippers, and the like. See for example U.S. Pat. Nos. 3,351,557, 3,539,521, 3,619,115 and 5,015,412.

The novel plastic compositions embodying the present invention are prepared by a number of methods. The novel plastic compositions can be compounded according to any one of several known techniques such as direct addition of all the components, master batching wherein any single master batch contains the inherently dissipative additive composition in a larger proportion relative to the final composition, or any other compounding procedure.

The master batching involves preparation of one or more "packages" or compositions which are subsequently combined into a single homogeneous mixture with the organic polymer material. In the master batching procedure, the inherently dissipative additive composition is initially present at a greater concentration than in the final composition. The separate master batch composition is then combined or blended in proper proportions to produce a polymeric composition embodying the present invention. This master batching technique is a preferred method in that it should improve the dispersibility of the inherently dissipative additive composition throughout the final polymeric composition.

Another preferred method consists essentially of heating the polymer at a temperature below its decomposition temperature, incorporating the initial ingredients of the inherently dissipative additive composition, and mixing so as to obtain a substantially uniform plastic composition. The composition can then by molded and cooled to form a solid molded article. In the alternative, the plastic composition can be extruded and cooled to form a solid extrudate. Conventional plastic processing equipment can be used for melting the polymer, mixing the polymer with the initial ingredients of the inherently dissipative additive composition and molding or extruding the resulting plastic composition. The resulting plastic composition or the inherently dissipative additive composition itself may be laminated onto a substrate to form articles whose surface dissipates static electrical charges. Such lamination processes may evolve the quaternary ammonium compound. It is believed that it only facilitates the bonding of the polyester and polyurethane compounds. Processing conditions, such as temperature, time, and pressure, will be obvious to those skilled in the art.

Yet another preferred process for preparing the novel plastic compositions of this invention consists essentially of blending the initial ingredients of inherently dissipative additive composition, optionally, with a solid polymer to obtain a substantially uniform plastic composition. The polymer and the inherently dissipative additive composition are each preferably in the form of pellets, granules or powder. Conventional plastic processing equipment can be used in the blending operation. The processing conditions will be obvious to those skilled in the art. The resulting plastic composition can be melted at a temperature below the decomposition temperature of the polymer and the initial ingredients of inherently dissipative additive composition. The resulting melt can be extruded or molded and cooled to form a solid extrudate or molded or laminated article.

A preferred process for preparing the novel plastic composition of this invention consists essentially of casting a film from the inherently dissipative additive composition and, optionally, the polymer in combination therewith in an inert solvent or diluent. By "inert solvent" is meant that the solvent does not react with the polymer or the additive composition or the initial ingredients thereof Use of this method is particularly attractive for preparing coatings or adhesive materials.

In another preferred embodiment of the present invention, a cellular thermoplastic material is formed from a composition containing a polymer, the inherently dissipative additive composition, and a blowing agent. The blowing agent is a substance which releases a substantial volume of gas under appropriate conditions, either by chemical decomposition to gaseous products (chemical blowing agents) or by physical vaporization (physical blowing agents). Suitable chemical blowing agents include azodicarbonamide, azobisisobutyronitrile, 4,4'-oxybis(benzene sulfonyl hydrazide), and sodium bicarbonate, preferably sodium bicarbonate together with ascorbic acid or citric acid. Suitable physical blowing agents include nitrogen, carbon dioxide, trichlorofluoromethane and dichlorodifluoromethane. As an example, a cellular (foamed) plastic material may be prepared by melting and extruding a combination of a polyolefin, inherently dissipative additive composition hereof, and a physical blowing agent. The processing conditions similar to those employed for the fabrication of extruded polyolefin foams lacking the additive hereof may be used. If desired, a composite may be prepared by co-extruding a cellular plastic material with a non-cellular composition of the same or a different polymer. Either layer or both layers may be modified by the incorporation of the additive hereof, i.e., inherently dissipative additive composition. The foam or composite may be oriented, uniaxially or biaxially, in the course of extrusion.

The novel polymeric compositions of the present invention can also contain non-reactive additives. By the term "non-reactive additives," it is meant a modifying additive, filler or reinforcement commonly used in the formulation of plastic compositions which does not materially interfere with the electrostatic dissipative properties of the inherently dissipative additive composition. For example, the compositions of the invention may contain, in addition to the essential inherently dissipative additive composition and the optional polymer, such additives as lubricants, plasticizers, dyes, pigments, anti-block agents, slip agents, processing aids, adhesion promoters, flame retardants, particulate fillers, and fibrous reinforcements. In particular, the use of such particulate fillers and reinforcements as calcium carbonate, talc, clays, glass, and mica is contemplated.

Antioxidants and stabilizers may also be utilized in the polymeric compositions embodying the present invention. In some cases, it may be necessary to add an antioxidant or stabilizer to permit high temperature processing, even though such additive may have some adverse effects on the electrostatic dissipative properties of polymeric composition.

The preferred antioxidant for this purpose is tetrakis [methylene(3,5-di-tert-butyl-4-hydroxy-hydrocinnamate)] methane. This composition is sold as IRGANOX 1010 by Ciba-Geigy and disclosed by U.S. Pat. Nos. 3,285,855 and 3,644,482, which are hereby incorporated by reference. Other suitable antioxidants are disclosed in U.S. Pat. No. 3,867,324, which is hereby incorporated by reference. The antioxidant(s) is used in a total amount of about 0.001 to about 0.05 percent by weight of the plastic composition.

It is contemplated that the plastic composition of this invention will ordinarily contain from 0 to 99.9 percent by weight of the organic polymer and 0.01 percent to 100 percent by weight of the inherently dissipative additive composition. The inherently dissipated additive composition will ordinarily contain from about 20 to about 35% by weight, preferably from about 23 to about 27% by weight, of the polyurethane, from about 2 to about 8% by weight, preferably from about 4 to about 6% by weight, of the polyester and from about 0.1 to about 1% by weight, preferably from about 0.3 to about 0.5% by weight, of the quaternary ammonium sulfonate compound.

In a preferred embodiment, the composition is about 98 to about 60 percent by weight of the organic polymer and about 2 to about 40 percent by weight of inherently dissipative additive composition.

The practice of this invention is particularly suitable for preparing or use as a composition for making heat sealable, electrostatic protective, flexible barrier materials for the packaging of items such as microcircuits, sensitive semiconductor devices, sensitive resistors, and associated higher assemblies. These materials are transparent or translucent, waterproof, electrostatic protective and static dissipative.

The merits of the present invention will be better understood by referring to the following illustrative examples.

EXAMPLES

In the following Examples, blown films of low density polyethylene (LDPE) containing various materials were prepared in order to test and evaluated such materials as antistats. The various films were tested for initial charge (volts), surface resistivity (Ohms per square) decay rate (seconds) and compatibility of the blend components.

The materials utilized low density polyethylene were:

1. LDPE: film grade low density polyethylene specified as 2 melt index resin in solid pellet form available from Rexene, Dallas, Tex.

2. Stat-Rite® C-2300: a Segmented Polyether Urethane (SEU) in solid pellet form available from B. F. Goodrich Company, Specialty Polymers and Chemicals Division, Akron, Ohio. Such Segmented Polyether Urethanes (SEU) are believed to have the following structure:

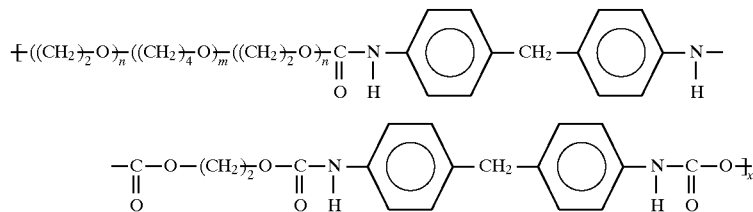

and are believed to be prepared in accordance to U.S. Pat. No. 5,159,053, previously incorporated herein by reference.

3. Tone® Polymer P767E: a polycaprolactone (PCL) in solid pellet form available from Union Carbide Chemicals and Plastics Company Inc., 39 Old Ridgebury Road, Danbury, Conn., 06817-0001. Polycaprolactones have the following structure:

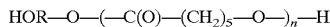

where R is an aliphatic segment.

4. Larostat® HTS 905 Antistatic agent: an ammonium sulfonate available as a viscous clear liquid from Mazer Chemicals, Inc., Gurnee, Ill. This material is believed to have the following chemical structure.

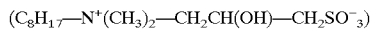

with the nitrogen having a positive charge and the sulfonate having a negative charge.

The surface resistivity test was conducted in accordance with ASTM D 257. This test is used to determine surface resistivity by measuring the surface resistance between two electrodes forming opposite sides of a square. The resistance is then converted to surface resistivity and is reported in Ohms per square (Ohms/sq). Specifically, in this test, an adapter compresses an upper electrode and a lower circular electrode encircled with a ringing electrode. A sheet sample (3.5" in diameter and ⅛" to 1/16" thick) is place between the upper and lower electrodes, and a voltage of 500 volts was applied between the electrodes. After sixty (60) seconds, the resistance is recorded using an ohmmeter and converted into surface resistivity in Ohms per square.

The static decay rate test was carried out in accordance with Military Specification MIL-B-81705C, "Barrier Materials, Flexible, Electrostatic Protective, Heat Sealable" dated Jan. 25, 1989 with a Static Decay Meter, model 406C obtained from Electro-Tech Systems, Inc. Static decay is a measure of the ability of a material, when grounded, to dissipate a known charge that has been induced on the surface of the material. A sample sheet (3" by 6") with ⅛" to 1/16" thickness is placed between clamp electrodes contained in a Faraday cage. A 5000 volt positive and negative charge, respectively, is applied to the surface of the specimen and the time in seconds required to dissipate the charge to 0 volts after a ground is provided, it is then measured. For purposes of the following examples, this test was run on samples conditioned for forty-eight (48) hours at 15% relative humidity (RH).

EXAMPLE I

In this example, the electrostatic dissipative properties of a composition within the scope of the present invention were investigated.

Sample A was prepared utilizing a concentrate (masterbatch). The concentrate for Sample A was formulated as shown in Table 1.

TABLE 1

| Formulation | Concentrate A | |
|---|---|---|
| | % Wt. | Gram Wt. |
| State-Rite ® C-2300P | 80.0 | 48.0 |
| Tone ® Polymer 767E | 19.0 | 11.4 |
| Larostat ® HTS905 | 1.0 | 0.6 |
| Total | 100.0 | 60.0 |

The mixing equipment utilized to prepare Concentrate A was a Rheocord System 40 torque rheometer with a Rheomix Type 600 mixer. In this example, Stat-Rite® C-2300P was hand-mixed with Tone® Polymer P767E. The blend of Stat-Rite® C-2300P and Tone® D Polymer P767E was then fed into the mixing chamber of the mixer and then fluxed. While fluxing, the Larostat® HTS905 was added to the batch, and the equipment's three zones were set at 140° C. The mixer was program for 50 RPM for three (3) minutes, then increased to 75 RPM for two minutes to complete the flux of the mixture. Accordingly, the duration of the processing time was programmed for five (5) minutes. At the end of five (5) minutes, the motor that drove the Rheomix 600 stopped automatically.

Concentrate A was recovered from the mixing chamber of the Rheomix Type 600 mixer. Concentrate A was in bulk form and light-yellow in color. Concentrate A was then pressed into a thin sheet of material known as a "pressout". The respective pressout was then cut into small size square chips (⅛" by ⅛" in size) called "pellets". The press machine used to make the pressouts was a Carver Lab Press, Model # 2731, Serial # 2731-17.

Low density polyethylene (LDPE) and the pellets of Concentrate A were combined in a plastic bag and physically mixed. About 280 grams (70% wt.) of LDPE and about 120 grams (30% wt.) of Concentrate A were combined in order to prepare Sample A (also referred to as PM 11205E). The physically mixed ingredients for Sample A were fed into the hopper of a blown film machine to prepare blown films of Sample A. The blown film machine was a San Chih Machinery, Inc. Model MNE-42, HPDE Blown Film Machine. The extruder thereof had a screw diameter of 42 mm, a screw ratio of 30:1 L/D, extruder speed of 120 RPM and a die diameter of 50 mm. The temperature setting for the four extruder zones thereof was 150° C. Other settings for the blown film machine were a take-up roller speed of about 400 RPM (dial reading), thickness of about 1.8 mil to about 2.3 mil and a blow-up ratio of about 2.5:1.

The results of the surface resistivity test and decay rate test are recorded in Table 2 for Sample A.

EXAMPLE II

Samples B through F were prepared utilizing Concentrate A together with low density polyethylene (LDPE), high density polyethylene (HDPE), polypropylene (PP), acrylonitrile-butadiene-styrene copolymer (ABS) and polystyrene (PS). The amount of each one of these materials (in weight percent) is shown in Table 2, together with the surface resistivity and decay rate tests results. The various polymers were combined with pellets of Concentrate A in a plastic bag and physically mixed and blown films prepared in the same manner as in Example I.

The following comparative examples were prepared by first mixing the components and then fluxing them to form the films of the composition of the respective comparative example.

COMPARATIVE EXAMPLE NO. 1

The first experiment was to incorporate the SEU in polyethylene using the following formulae and process:

| Ingredient | % Wt. | Supplier |
| --- | --- | --- |
| 1. Stat-Rite ® C-2300 | 10 | B. F. Goodrich |
| LDPE | 90 | Rexene |
| Total | 100 | |
| 2. Stat-Rite ® C-2300 | 20 | B. F. Goodrich |
| LDPE | 80 | Rexene |
| Total | 100 | |
| 3. Stat-Rite ® C-2300 | 30 | B. F. Goodrich |
| LDPE | 70 | Rexene |
| Total | 100 | |

Results:

Formula No. 1 produced a semi-uniform mixture, which is an indication of limited compatibility with polyethylene. However, the film produced with Formula No. 1 had an inherent electrical charge of 300 volts.

Formula No. 2 produced a completely non-uniform mixture, with poor quality film with high inherent charge.

Formula No. 3 produced a completely non-uniform mixture, with poor quality film with high inherent charge.

| Formula | Initial Charge | Surface Resistivity | Compatibility | Decay Rate |
| --- | --- | --- | --- | --- |
| 1. (10%) | 300 V | $10^{13}$ | Fair | ∞ |
| 2. (20%) | 2500 V | >$10^{13}$ | Not Good | ∞ |
| 3. (30%) | 1200 V | $10^{13}$ | Not Good | ∞ |

COMPARATIVE EXAMPLE NO. 2

In this experiment an attempt was made to incorporate polycaprolactone (PCL) into polyethylene (LDPE) to pro-

TABLE 2

| Sample | % WT Concentrate A | % WT LDPE | % WT HDPE | % WT PP | % WT ABS | % WT PS | Surface Resisitivity (Ohm/Sq) | Decay Rate (Sec) |
| --- | --- | --- | --- | --- | --- | --- | --- | --- |
| A | 30 | 70 | 0 | 0 | 0 | 0 | $3.1 \times 10^{10}$ | 0.16 |
| B | 25 | 75 | 0 | 0 | 0 | 0 | $4.4 \times 10^{10}$ | 0.24 |
| C | 40 | 0 | 60 | 0 | 0 | 0 | $1.1 \times 10^{11}$ | 0.20 |
| D | 30 | 0 | 0 | 70 | 0 | 0 | $2.2 \times 10^{11}$ | 1.50 |
| E | 30 | 0 | 0 | 0 | 70 | 0 | $7.8 \times 10^{9}$ | 0.05 |
| F | 30 | 0 | 0 | 0 | 0 | 70 | $3.6 \times 10^{10}$ | 0.25 |

The use of the ammonium sulfonate compound in combination with the polyurethane and polyester in the preparation of this novel composition has proved to be highly effective in forming ionic bonds even in non-polar polymers, such as polyolefins. In order to demonstrate that the combination of the three materials (materials 2, 3 and 4 above) with a non-polar polymer, e.g. LDPE, provided surprising results, a series of comparative examples with various combinations of the initial ingredients with LDPE were performed.

duce antistatic polymer, using the following formulae:

| Ingredient | % Wt. | Supplier |
| --- | --- | --- |
| 1. Tone ® Polymer 767E | 10 | Union Carbide |
| LDPE | 90 | Rexene |
| Total | 100 | |
| 2. Tone ® Polymer 767E | 20 | Union Carbide |

-continued

| Ingredient | % Wt. | Supplier |
|---|---|---|
| LDPE | 70 | Rexene |
| Total | 100 | |
| 3. Tone ® Polymer 767E | 30 | Union Carbide |
| LDPE | 70 | Rexene |
| Total | 100 | |

Results:

The results of Comparative Example No. 2 are shown in the following table:

| Formula | Initial Charge | Surface Resistivity | Decay Rate | Compatibility |
|---|---|---|---|---|
| 1. | 1000 V | >$10^{14}$ | ∞ | Fair |
| 2. | 400 V | >$10^{14}$ | ∞ | Fair |
| 3. | 800 V | >$10^{14}$ | ∞ | Fair |

COMPARATIVE EXAMPLE NO. 3

3-(N,N-dimethyl-N-hexadecylammonio)-2-hydroxypropane-1-sulfonate, also referred to as ethoxylated dimethyl octyl-ammonium methyl sulfonate, available from PPG LAROSTAT HTS 905, is known to be an effective antistat in non-olefinic polymers. This study attempted to incorporate this chemical into polyethylene polymer as an antistat. The result was a non-compatible mixture at any level, with no antistatic properties. The LDPE sample was a 2 mil film; HDPE and PP were molded into 60 mil plaques.

| % WT Larostat 905 | % WT LDPE | % WT HDPE | % WT PP | Surface Resistivity (Ohm/Sq) | Decay (Sec) |
|---|---|---|---|---|---|
| 0.5 | 99.5 | 0 | 0 | >$10^{13}$ | ∞ |
| 1.0 | 99 | 0 | 0 | >$10^{13}$ | ∞ |
| 1.5 | 0 | 98.5 | 0 | >$10^{13}$ | ∞ |
| 2.0 | 0 | 98 | 0 | >$10^{13}$ | ∞ |
| 1.5 | 0 | 0 | 98.5 | >$10^{13}$ | ∞ |
| 2.0 | 0 | 0 | 98 | >$10^{13}$ | ∞ |

Ethoxylated dimethyl octyl-ammonium methyl sulfonate was selected for the compositions of the present based on several factors:

1. Its well-electrically-balanced structure would contribute to the ionization of the resultant composition.
2. Sulfonate ion ($SO_3$) with an ionic conductance of 79.9 mho-cm$^2$/equivalent is highly effective in forming an ionic bridge.

Several organic and inorganic ionic compounds were tested instead of above chemical to see if ionization of the composition could also be enhanced. Materials tested were:

a. Zirconium (oxide and salts of)—no effect.
b. Sodium zirconium silicate (high proton transfer ability)—no effect.
c. Polyhydroxylated organic compound (in combination with sodium zirconium silicate)—no reaction was observed during processing, and no effect on final performance.

COMPARATIVE EXAMPLE NO. 4

This experiment evaluated the antistatic performance of compositions using a combination of PCL, Larostat 905, and LDPE.

| INGREDIENT | % WT. |
|---|---|
| 1. Tone ® Polymer (PCL) | 5 |
| 2. Larostat ® HTS 905 | 1 |
| 3. LDPE | 94 |
| Total | 100 |

This blend processed very well and produced an acceptable film quality with two (2) mil thickness. However, the film did not have any antistatic properties.

Results of Comparative Example No. 4:

| Initial Charge (Volts) | Surface Resistivity (Ohm/Sq) | Decay Rate (Sec) |
|---|---|---|
| 150 | >$10^{13}$ | ∞ |

COMPARATIVE EXAMPLE NO. 5

This experiment was conducted to evaluate compounds made with Stat-Rite® 2300 and Larostat® HTS 905 as antistats.

| INGREDIENT | % WT. |
|---|---|
| 1. Larostat 905 | 1 |
| 2. Stat-Rite ® 2300 | 24 |
| 3. LDPE | 75 |
| Total | 100 |

The film quality produced from this blend was poor and difficult to process.

Results of Comparative Example No. 5:

| Initial Charge (Volts) | Surface Resistivity (Ohm/Sq) | Decay Rate (Sec) |
|---|---|---|
| 0 | 8.5 × $10^{12}$ | 27.36 |

Increasing the level of ingredients 1 or 2 made the compounding process impossible.

EXAMPLE III

Several tests were conducted to verify the presence of hydrogen bonded structures in the compositions of the present invention. The analysis of the samples for this particular study involved the use of Attenuated Total Reflectance (ATR) and Fourier Transform Infrared (FTIR) Spectroscopy. Infrared spectroscopy is a method for examining vibrations amongst atoms in molecules. The frequency of a vibration depends on the electronic nature of the bond as well as the mass of the bonded atoms. Infrared radiation is absorbed when the frequency of the radiation is the same as the molecular vibration and there is an associated change in the dipole moment of the molecular bond. ATR is a useful technique for providing information related to the surface (60° angle) material as well as information relating to beneath the surface of or within the polymer (45° angle).

The FTIR spectrometer used to collect the infrared spectra was a Digilab FTS-40 spectrometer equipped with an UMA 300 infrared scope. The FTIR spectrometer also had a He—Ne laser to permit the interferogram to be digitized at equal intervals of retardation. The laser-referenced interferometer provided a very high accuracy (to approximately 0.005 cm$^{-1}$). A total of 1024 scans and a resolution of 4 cm$^{-1}$ was used to collect each of the spectra. A Veemax Variable Angle ATR attachment was used to study the film samples. ATR spectra were collected at incidence angles of 45° and 60°.

These analyses were performed on a composition according to Example I and on a composition referred to as having the formula for amide-type antistats identified in the background section hereof when R is a $C_{12}$-alkyl (referred to as "Diethanolamide" or "DEA," herein) for the purpose of comparing it with the antistat composition of the present invention. Diethanolamide is a typical internal antistat made from an amide chemical group considered to be a migratory additive. The analysis was performed on samples of films and concentrates. In order to penetrate the polymer below the surface, samples of concentrates were first microtoned, then analyzed at different angles of 60° and 45°.

Figure 2:
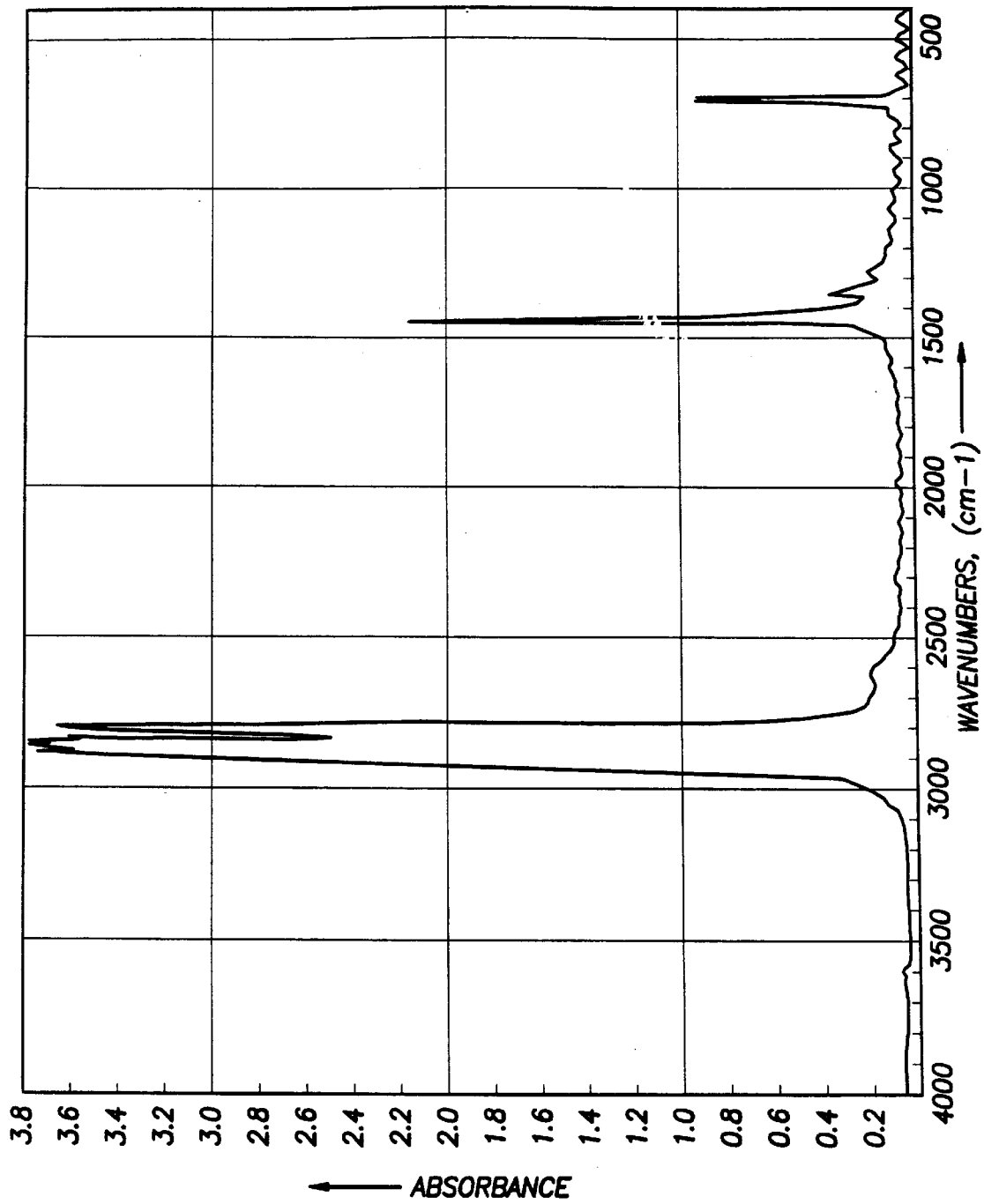
FIG. 2 is the Macro-FTIR absorbance curve of a polymer composition containing a conventional antistat.
Figure 3:
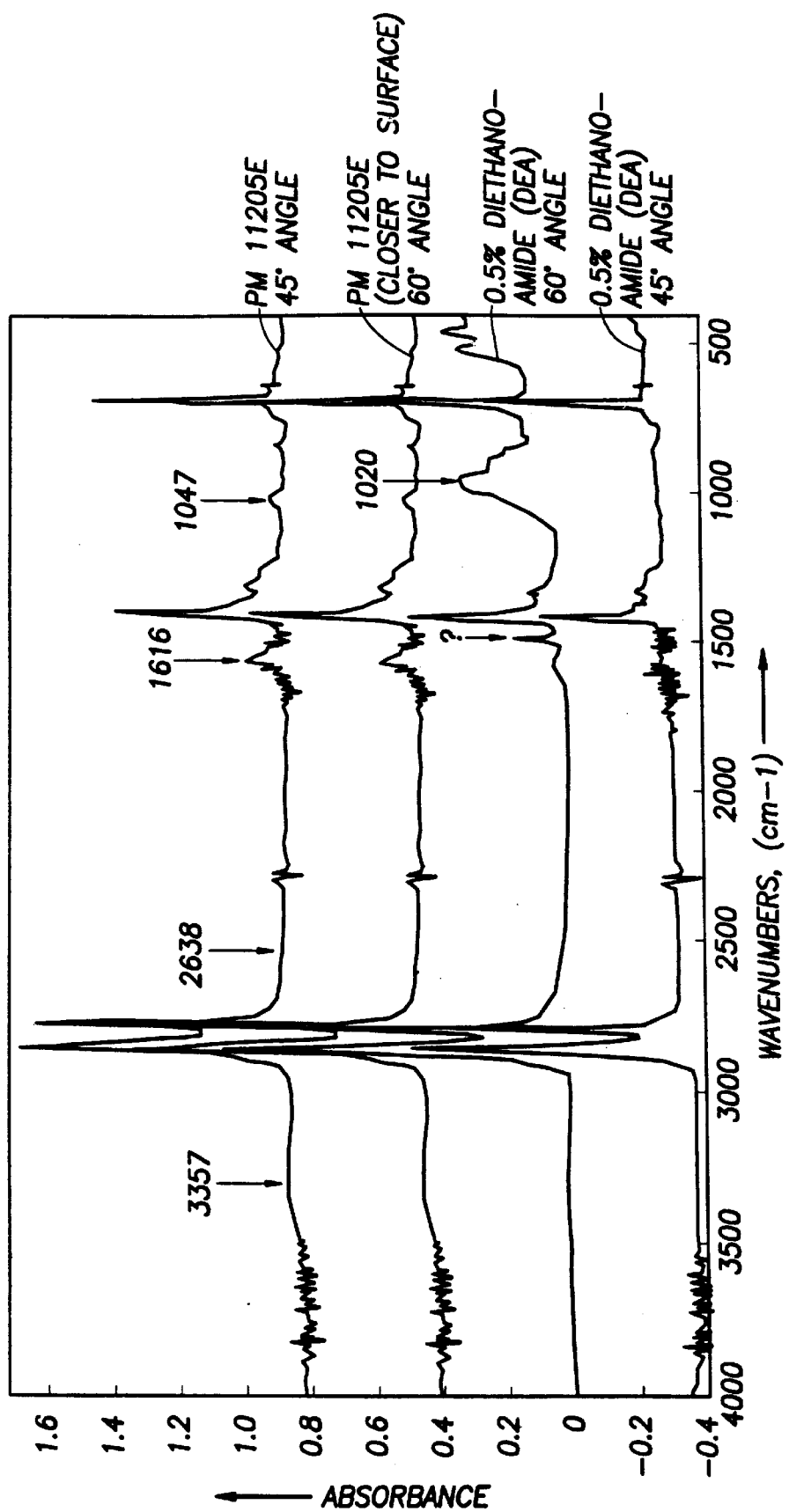
FIG. 3 is the Macro-FTIR analysis of both Concentrate A and the conventional antistat at two different angles: 45° for the interpolymer structure, and 60° for the surface analysis.

FIG. 1 is the Macro-FTIR absorbance curve of PM-1990E (composition according to Example I), which shows the hydrogen bonded structure (N—H stretching) peaking at the 3320–3370 cm$^{-1}$ range, and when compared with the Diethanolamide absorbance curve, the peak at the same wavelength is missing (see FIG. 2). FIG. 3 is a Micro-FTIR analysis of both PM-1990E (new antistat) and Diethanolamide (conventional antistat) at two different angles: 45° for the inner polymer structure, and 60° for the surface analysis. It compares these two antistats and indicates their differences.

Further analysis of FIGS. 1 and 3 also reveals the electron cloud formation in the form of the C=O functional group which shows at the 1731 cm$^{-1}$ wavelength. The significance of this electron cloud is the ionization of the polymer for the purpose of achieving its electrical dissipative property. For the new antistat, the 1731 cm$^{-1}$ peak can be seen on the surface at 60°, and under the surface at a 45° angle, while the electron cloud does not exist in the Diethanolamide sample.

Figure 4:
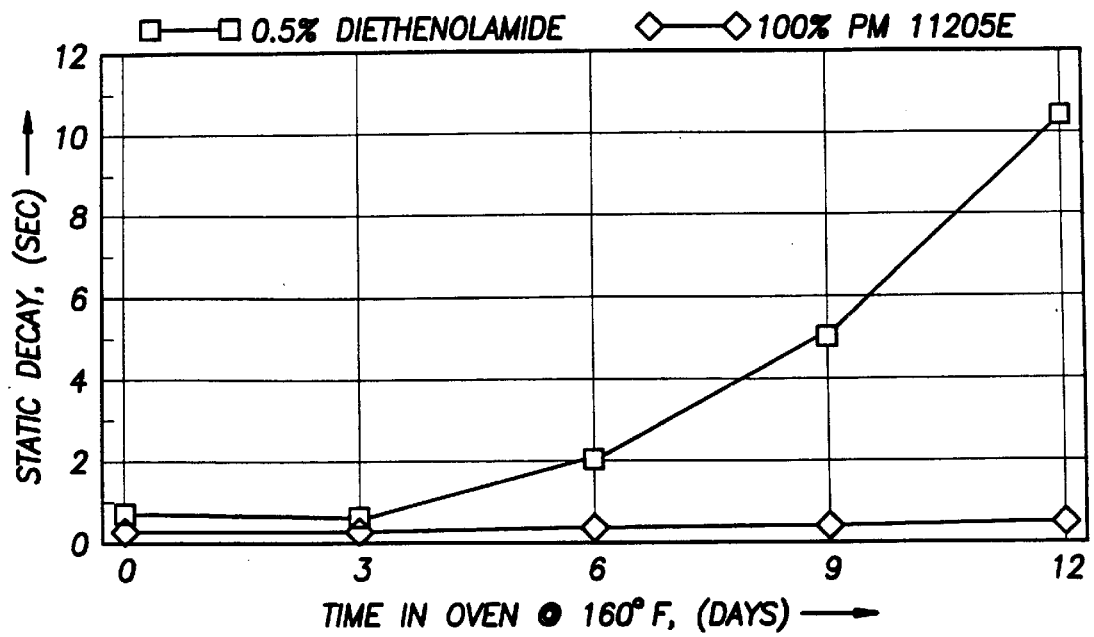
FIG. 4 is a graph of static decay rate (in seconds) versus days in an oven depicting the results of a longevity test comparing a polymer composition (also referred to as PM 11205E) containing LDPE plus 30% of Concentrate A and a polymer composition containing LDPE plus 0.5% diethanolamide (a conventional antistat).
Figure 5:
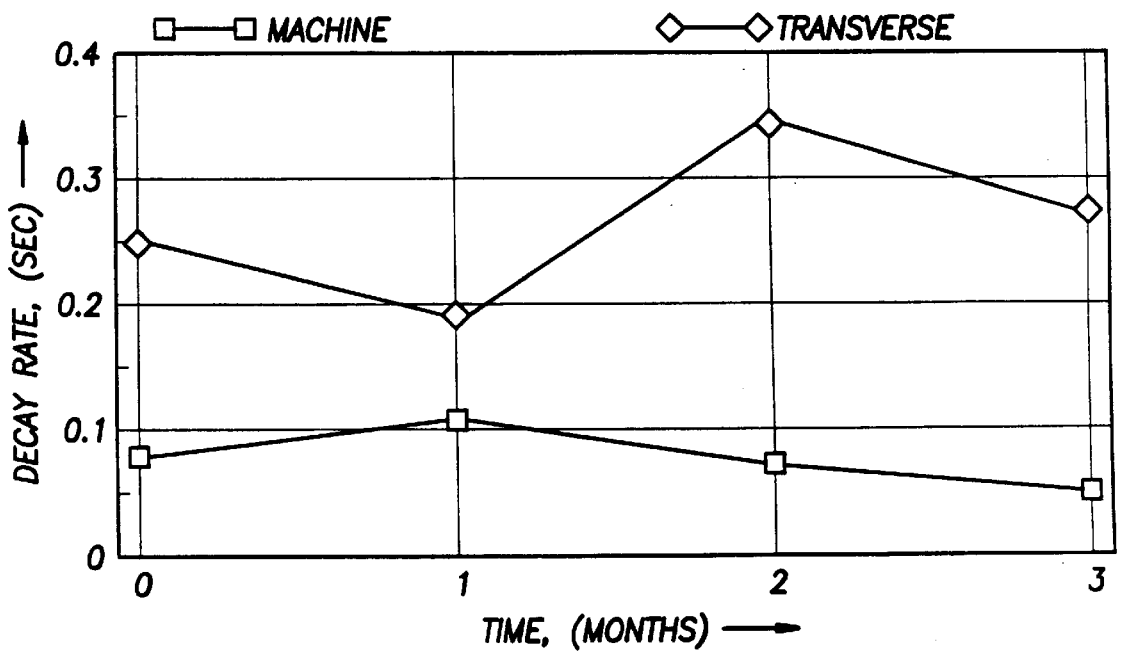
FIG. 5 is a graph of decay rate (in seconds) versus time in months depicting the results of a warehouse aging test of a polymer composition (also referred to as PM 11205E) containing LDPE plus 30% of Concentrate A.

The analyses that were performed on the samples of Example 1 using ATR, FTIR, and Micro-FTIR all indicated the production of a highly ionized polymer that was forming electrical bridges within the polymer matrix, for the purpose of dissipating the static charges. In order to test the permanency of this polymer, a 2 mil LDPE film according to Example 1 was produced and tested according to Military Specification MIL-B-81705C. This data is shown in Table 3 and FIG. 5. The same piece of film was then placed in an oven at 160° F. and twelve (12) days later was tested according to the same specification. In addition, a sample of film made with conventional antistat was tested under the same conditions after 12 days, and the results are shown in FIG. 4. Performance test results indicated the permanency under storage conditions of the new antistat.

The conventional Diethanolamide antistat is present at a lower concentration in the polymer composition than the composition using the additive of the present invention because the conventional additive blooms to the surface very quickly at higher concentrations. Further, in order to meet the surface resistivity and decay rate of Military Specification MIL-B-81705C, 30% by weight of the PM-1990E is needed.

Figure 6:
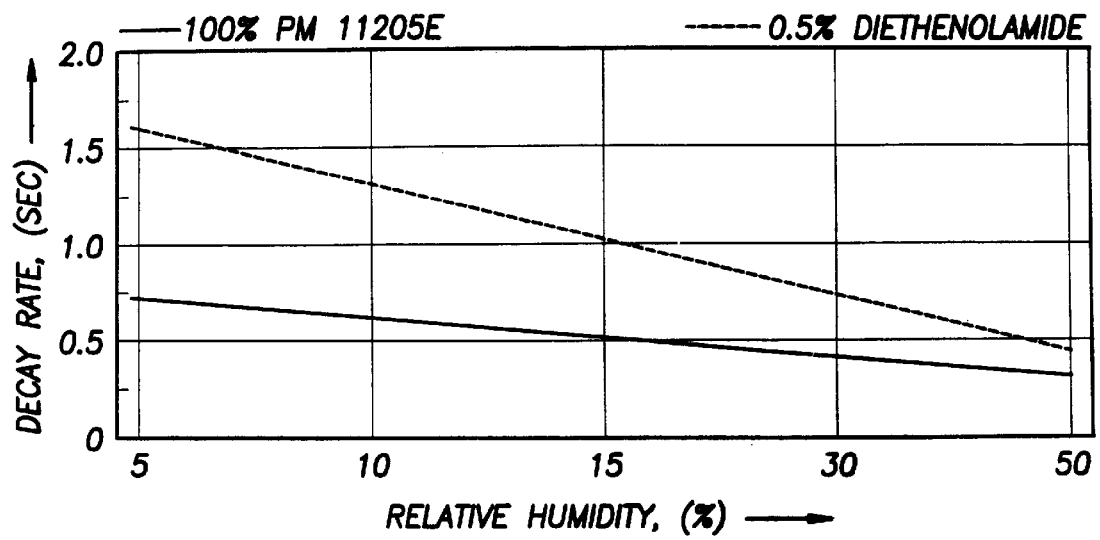
FIG. 6 is a graph of decay rate (in seconds) versus percent relative humidity of compositions of LDPE containing 30% of Concentrate A and of LDPE containing 0.5% diethanolamide (a conventional antistat).
Figure 7:
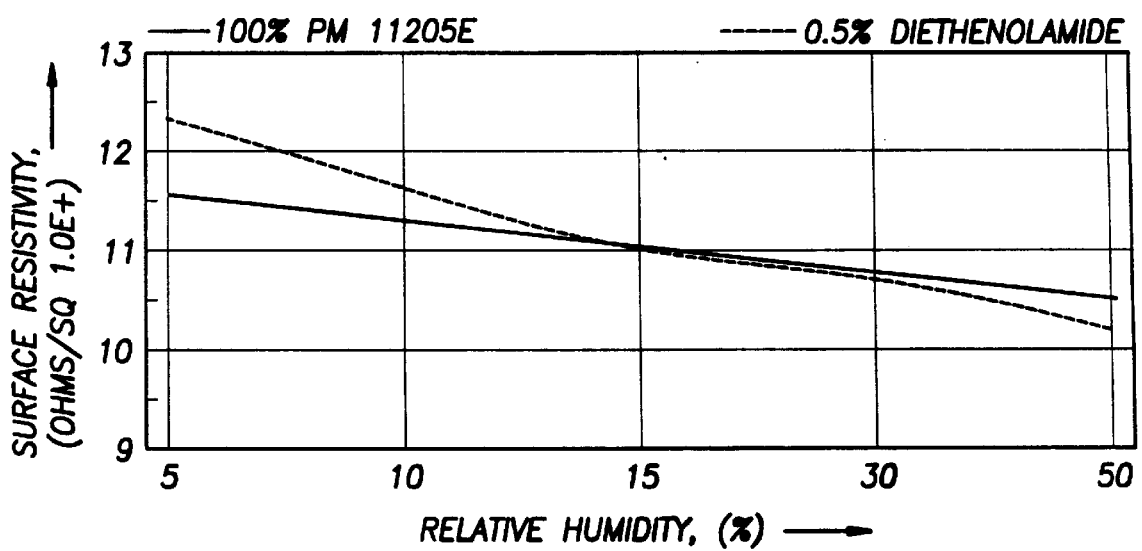
FIG. 7 is a graph of surface resistivity versus percent growth of humidity on compositions containing LDPE and 30% Concentrate A and containing LDPE and 0.5% diethanolamide (a conventional antistat).

FIGS. 6 and 7 compare the performance of a sample prepared according to Example 1 having a thickness of about 2 mil and a sample using the foregoing conventional antistat.

TABLE 3

| | Warehouse Aging Testing | | | | | | | |
|---|---|---|---|---|---|---|---|---|
| | After 24 hours of Aging | | After 1 week of Aging | | After 2 weeks of Aging | | After 3 weeks of Aging | |
| | Machine | Transverse | Machine | Transverse | Machine | Transverse | Machine | Transverse |
| Surface Resistivity (Ohms/sq.) | 4.3 × 10E10 | 4.6 × 10E10 | 1.2 × 10E10 | 1.2 × 10E11 | 1.0 × 10E11 | 3.4 × 10E11 | 4.0 × 10E10 | 8.7 × 10E10 |
| Initial Charge (volts) | 0 | 0 | 0 | 0 | 0 | 0 | 0 | 0 |
| Static Decay @ +5,000 volts (seconds) | 0.08 | 0.25 | 0.05 | 0.17 | 0.04 | 0.33 | 0.1 | 0.17 |
| Static Decay @ −5,000 volts (seconds) | 0.17 | 0.27 | 0.12 | 0.27 | 0.12 | 0.59 | 0.13 | 0.27 |

| | After 1 month of Aging | | After 2 months of Aging | | After 3 months of Aging | |
|---|---|---|---|---|---|---|
| | Machine | Transverse | Machine | Transverse | Machine | Transverse |
| Surface Resistivity (Ohms/sq.) | 1.5 × 10E10 | 2.1 × 10E11 | 2.6 × 10E10 | 4.2 × 10E11 | 3.5 × 10E10 | 1.7 × 10E11 |
| Initial Charge (volts) | 0 | 0 | 0 | 0 | 0 | 0 |
| Static Decay @ =5,000 volts (seconds) | 0.11 | 0.19 | 0.07 | 0.34 | 0.05 | 0.17 |
| Static Decay @ −5,000 volts (seconds) | 0.21 | 0.28 | 0.09 | 0.51 | 0.08 | 0.3 |

All samples are taken from different area of the film.

Example IV

In this example, the inherently dissipative agent itself is as used as the thermoplastic composition for the final article (note that the balance of the formulations for Sample G and H is LDPE). Sample H (also referred to as "PM 11205E" herein) corresponds to Concentrate A of Example I. Sample G was prepared in a manner like that in Example I using the formulation shown in Table 4. These compositions proved to be highly effective in dissipating electric charge.

TABLE 4

| Formulation[a] | Sample G | Sample H |
|---|---|---|
| Stat-Rite C-2300P | 24 | 24 |
| Tone Polymer 760E | 5.85 | 5.7 |
| Larostat 905 | 0.15 | 0.3 |
| Surface Resistivity | 1.5x10E11 | 6.5x10E10 |
| Initial Charge (V) | 0 | 0 |
| Decay Rate (sec): | | |
| Machine Dir. | 0.91 | 0.38 |
| Transverse Dir. | 1.39 | 0.69 |
| Film Quality | good | good |

[a]Balance of composition is LDPE

Figure 8:
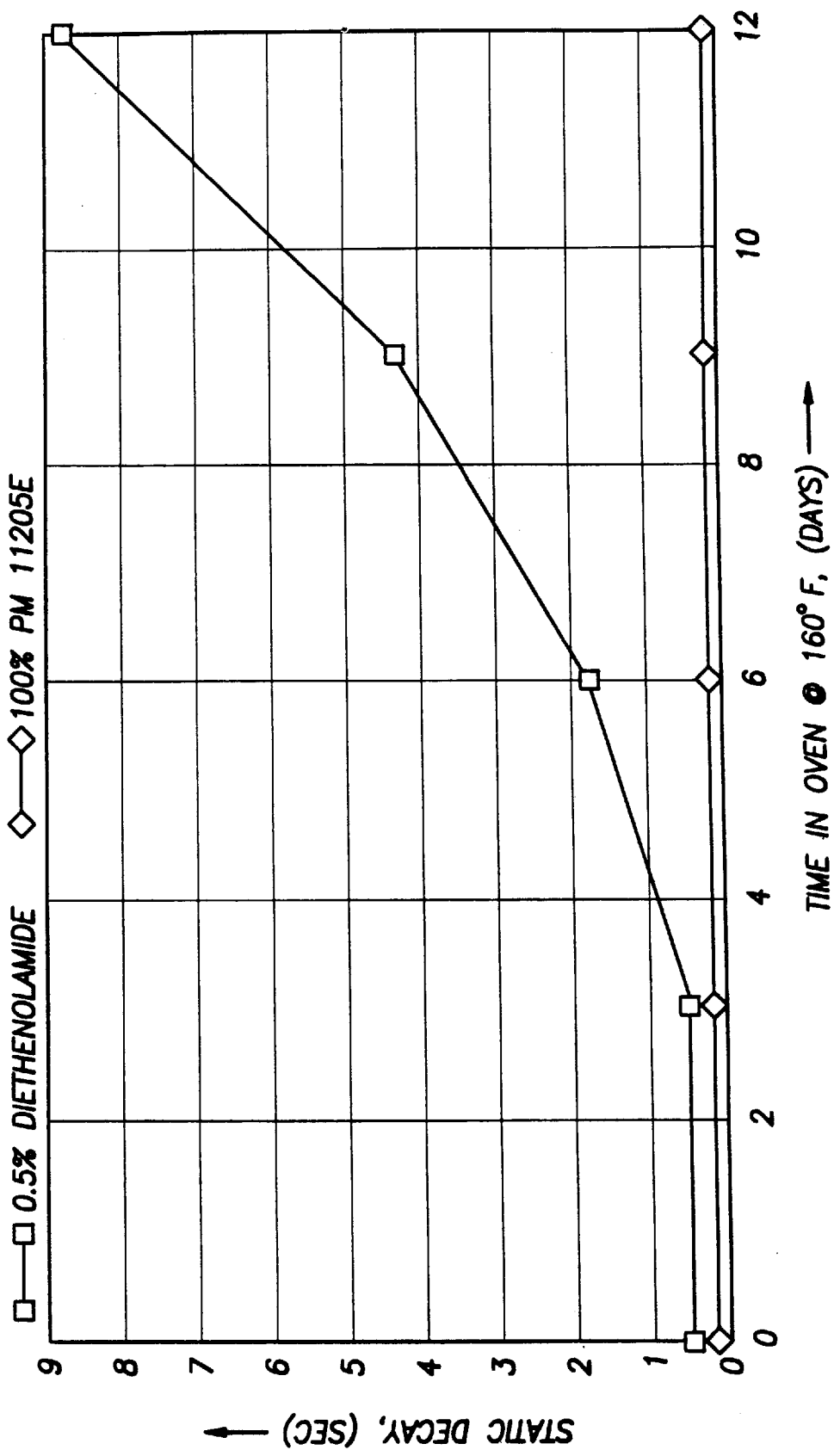
FIG. 8 is a graph of decay rate (in seconds) versus days in an oven depicting the results of a longevity test comparing a polymer composition designated Sample H (PM 22305E) and a polymer composition containing LDPE plus 0.5% diethanolamide.

Further, FIG. 8 depicts the results of an oven aging test where the superiority of a composition according to the present invention over a conventional antistat (antistat is referred to as "A/S"), i.e. 0.5% Diethanolamide. See also Tables 4 and 5.

TABLE 5

CONVENTIONAL A/S VS. PERMANENT A/S
TESTED AFTER 24 HOURS OF BLOWN FILM

| | 0.5% DEA* | | 100% PM 11205E | |
|---|---|---|---|---|
| Film Orientation | Machine | Transverse | Machine | Transverse |
| Surface Resistivity | $1.2 \times 10^{10}$ | $2.0 \times 10^{10}$ | $6.0 \times 10^{10}$ | $1.2 \times 10^{11}$ |
| Initial Charge | 0 | 0 | 0 | 0 |
| Decay Rate @ +5000 V. (sec.) | 0.51 | 0.52 | 0.22 | 0.59 |
| Decay Rate @ −5000 V. (sec.) | 0.53 | 0.53 | 0.33 | 0.63 |

*Diethanolamide

TABLE 6

COMPARISON OF USING PERMANENT
A/S VS. CONVENTIONAL A/S

| | 0.5% DEA* | 100% PM 11205E |
|---|---|---|
| • Permanency | NO | YES |
| • Colorable | YES | YES |
| • Migratory | YES | NO |
| • Greasy Surface | YES | NO |
| • Shelf-life (storage) | YES | NO |
| • Humidity dependency | YES | NO |
| • Corrosivity | YES | NO |

*Diethanolamide

What is claimed is:

1. A thermoplastic composition adapted for use as an electrostatic static dissipative agent, wherein the composition is prepared by combining at least the following initial ingredients:

a thermoplastic polyurethane, which is prepared by reacting a polyalkylene glycol, a diisocyanate and a chain extender having at least two hydroxyl groups;

a thermoplastic polyester, wherein the polyester is a polylactone; and a quaternary ammonium compound having the formula $$(C_nH_{2n+1}-N^+(CH_3)_2(A-X))-Y^-$$

wherein n is an integer ranging from 6 to 22,

A is the hydrocarbon residue of an alkylene oxide having from 2 to about 5 carbon atoms, X is hydrogen (—H) or a hydroxyl (—OH) group, and Y is $CH_3SO_3$, $CH_3SO_4$, $SO_4$.

2. A thermoplastic composition according to claim 1, wherein said polyurethane has an average molecular weight from about 60,000 to 500,000, a hydroxyl terminated ethylene ether oligomer intermediate having an average molecular weight from about 500 to 5,000 reacted with a non-hindered diisocyanate and said chain extender is an aliphatic extender glycol to produce said thermoplastic polyurethane, said oligomer intermediate being a polyethylene glycol;

wherein said polyethylene glycol consists of repeating ethylene ether units n wherein n is from about 11 to about 115, wherein said non-hindered diisocyanate is an aromatic or cyclic aliphatic diisocyanate, wherein said chain extender consists of nonether glycol having from 2 to 6 carbon atoms and containing only primary alcohol groups.

3. A thermoplastic composition according to claim 1, wherein said thermoplastic composition has a surface resistivity of less than about $1 \times 10^{13}$ Ohms/sq, as measured according to Military Specification MIL-B-81705C.

4. A thermoplastic composition according to claim 2, wherein said hydroxyl terminated polyester oligomer (a) contains on the average from 4 to 8 repeating ester units and has an average molecular weight from about 700 to 2,500.

5. A thermoplastic composition according to claim 1, wherein said polyester polymer has an average molecular weight from about 5,000 to about 100,000.

6. A thermoplastic composition according to claim 1, wherein said polyester polymer is poly($\epsilon$-caprolactone).

7. A thermoplastic composition according to claim 1, wherein the melting temperatures of the thermoplastic polyurethane and the thermoplastic polyester are within 100° C. of each other.

8. A thermoplastic composition according to claim 1, further comprising an additional organic polymeric material.

9. A thermoplastic composition adapted for use as an electrostatic dissipative agent, wherein the composition is prepared by combining at least the following initial ingredients;

a thermoplastic polyurethane, which is prepared by reacting a polyalkylene glycol, a diisocyanate and a chain extender having at least two hydroxyl groups;

a thermoplastic polyester, wherein the polyester is a polyactone; and a quaternary ammonium compound having the formula

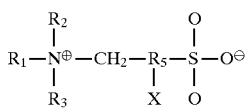

wherein $R_1$ represents an alkyl group having from about 6 to about 22 carbon atoms, $R_2$ and $R_3$ are each selected from the group consisting of methyl, ethyl, propyl, butyl, and hydroxyethyl groups, $R_5$ is an alkylene group having from 1 to about 3 carbon atoms, and X is selected from the group consisting of hydrogen (H—) and hydroxyl groups.

10. A thermoplastic composition according to claim 9, wherein the quaternary ammonium compound has the formula

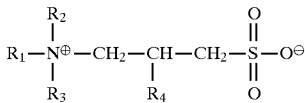

where

R$_1$ is a C6–C22 alkyl group;

R$_2$ and R$_3$ are a methyl group, a 2-hydroxy ethyl group, or a 2-hydroxy propyl group; and R$_4$ is H or OH.

11. A thermoplastic composition according to claim 1, wherein A is CH and X is OH.

12. A thermoplastic composition adapted for use in electrostatic dissipating applications, wherein the composition is prepared by combining at least the following initial ingredients:

a thermoplastic polyurethane, which is prepared by reacting a polyalkylene glycol, a diisocyanate and a chain extender having at least two hydroxyl groups;

a thermoplastic polyester, wherein the polyester is a polylactone; and a quaternary ammonium compound having the formula

wherein n is an integer ranging from 6 to 22,

A is the hydrocarbon residue of an alkylene oxide having from 2 to about 5 carbon atoms, X is hydrogen (—H) or a hydroxyl (—OH) group, and Y is CH$_3$SO$_3$, CH$_3$SO$_4$, SO$_4$.

13. A thermoplastic composition as set forth in claim 12, wherein said composition has a surface resistivity of less than about 1×10$^{13}$ Ohms/sq.

14. A thermoplastic composition as set forth in claim 12, wherein said composition further comprises an additional organic polymeric material.

15. A thermoplastic composition adapted for use in electrostatic dissipating applications, wherein the composition is prepared by combining at least the following initial ingredients:

a thermoplastic polyurethane, which is prepared by reacting a polyalkylene glycol, a diisocyanate and a chain extender having at least two hydroxyl groups;

a thermoplastic polyester, wherein the polyester is a polylactone; and a quaternary ammonium compound having the formula

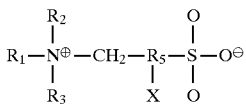

wherein R$_1$ represents an alkyl group having from about 6 to about 22 carbon atoms, R$_2$ and R$_3$ are each selected from the group consisting of methyl, ethyl, propyl, butyl, and hydroxyethyl groups, R$_5$ is an alkylene group having from 1 to about 3 carbon atoms, and X is selected from the group consisting of hydrogen (H—) and hydroxyl groups.

16. A thermoplastic composition as set forth in claim 15, wherein the quaternary ammonium compound has the formula.

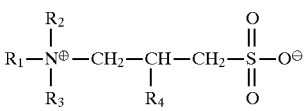

where

R$_1$ is a C6–C22 alkyl group;

R$_2$ and R$_3$ are a methyl group, a 2-hydroxy ethyl group, or a 2-hydroxy propyl group; and R$_4$ is H or OH.

17. In a thermoplastic composition having an organic polymeric material, an electrostatic dissipating agent wherein the agent is prepared by combining at least the following initial ingredients:

a thermoplastic polyurethane, which is prepared by reacting a polyalkylene glycol, a diisocyanate and a chain extender having at least two hydroxyl groups;

a thermoplastic polyester, wherein the polyester is a polylactone; and a quaternary ammonium compound having the formula

wherein n is an integer ranging from 6 to 22,

A is the hydrocarbon residue of an alkylene oxide having from 2 to about 5 carbon atoms, X is hydrogen (—H) or hydroxyl (—OH) group, and Y is CH$_3$SO$_3$, CH$_3$SO$_4$, SO$_4$.

18. A shaped article having electrostatic dissipating properties, wherein the article comprises a thermoplastic composition which is prepared by combining at least the following initial ingredients:

a thermoplastic polyurethane, which is prepared by reacting a polyalkylene glycol, a diisocyanate and a chain extender having at least two hydroxyl groups;

a thermoplastic polyester, wherein the polyester is a polylactone; and a quaternary ammonium compound having the formula

wherein n is an integer ranging from 6 to 22,

A is the hydrocarbon residue of an alkylene oxide having from 2 to about 5 carbon atoms, X is hydrogen (—H) and hydroxyl (—OH) group, and Y is CH$_3$SO$_3$, CH$_3$SO$_4$, SO$_4$.

19. The shaped article of claim 18, further comprising an additional organic polymeric material.

* * * * *